RECOGNITION TRAINER

Filed June 11, 1946 7 Sheets-Sheet 1

Inventors
ROBERT GLEN NYE
LAUREL T. APPLE

By M. O. Hayes
Attorney

July 4, 1950 R. G. NYE ET AL 2,514,289

RECOGNITION TRAINER

Filed June 11, 1946 7 Sheets-Sheet 2

INVENTORS
ROBERT GLEN NYE
LAUREL T. APPLE

BY [signature]
ATTORNEY

RECOGNITION TRAINER

Filed June 11, 1946 7 Sheets-Sheet 3

Inventors
ROBERT GLEN NYE
LAUREL T. APPLE
By M. A. Hayes
Attorney

July 4, 1950 R. G. NYE ET AL 2,514,289

RECOGNITION TRAINER

Filed June 11, 1946 7 Sheets-Sheet 4

Inventors

ROBERT GLEN NYE

LAUREL T. APPLE

By M. A. Hayes

Attorney

RECOGNITION TRAINER

Filed June 11, 1946 7 Sheets-Sheet 5

INVENTORS
ROBERT GLEN NYE
LAUREL T. APPLE
BY [signature]
Attorney

July 4, 1950 R. G. NYE ET AL 2,514,289

RECOGNITION TRAINER

Filed June 11, 1946 7 Sheets-Sheet 6

Inventors
ROBERT GLEN NYE
LAUREL T. APPLE
By M. A. Hayes
Attorney

July 4, 1950 R. G. NYE ET AL 2,514,289

RECOGNITION TRAINER

Filed June 11, 1946 7 Sheets-Sheet 7

Inventors
ROBERT GLEN NYE
LAUREL T. APPLE

By M. C. Hayes
Attorney

Patented July 4, 1950

2,514,289

UNITED STATES PATENT OFFICE 2,514,289

RECOGNITION TRAINER

Robert Glen Nye and Laurel T. Apple, San Diego, Calif., assignors to the United States of America as represented by the Secretary of the Navy Application June 11, 1946, Serial No. 675,860

7 Claims. (Cl. 35—1)

The present invention is related to training devices and more particularly to apparatus usable by a large class for reporting, recording and scoring answers.

Many underwater sounds can be identified by a trained listener. For example, certain types of ships can be distinguished by the sounds of their propellers, certain activities such as the launching of torpedoes produce recognizable characteristic noises.

It is an object of the present invention to provide apparatus for presenting recordings of such sounds to large groups of student-operators, and for drilling, testing, and scoring those students in the identification and appraisal of those sounds.

A further object is the provision of a new and improved reporting and scoring device.

These and other objects and advantages will appear from the following description of one embodiment. In the drawings.

Figure 1:
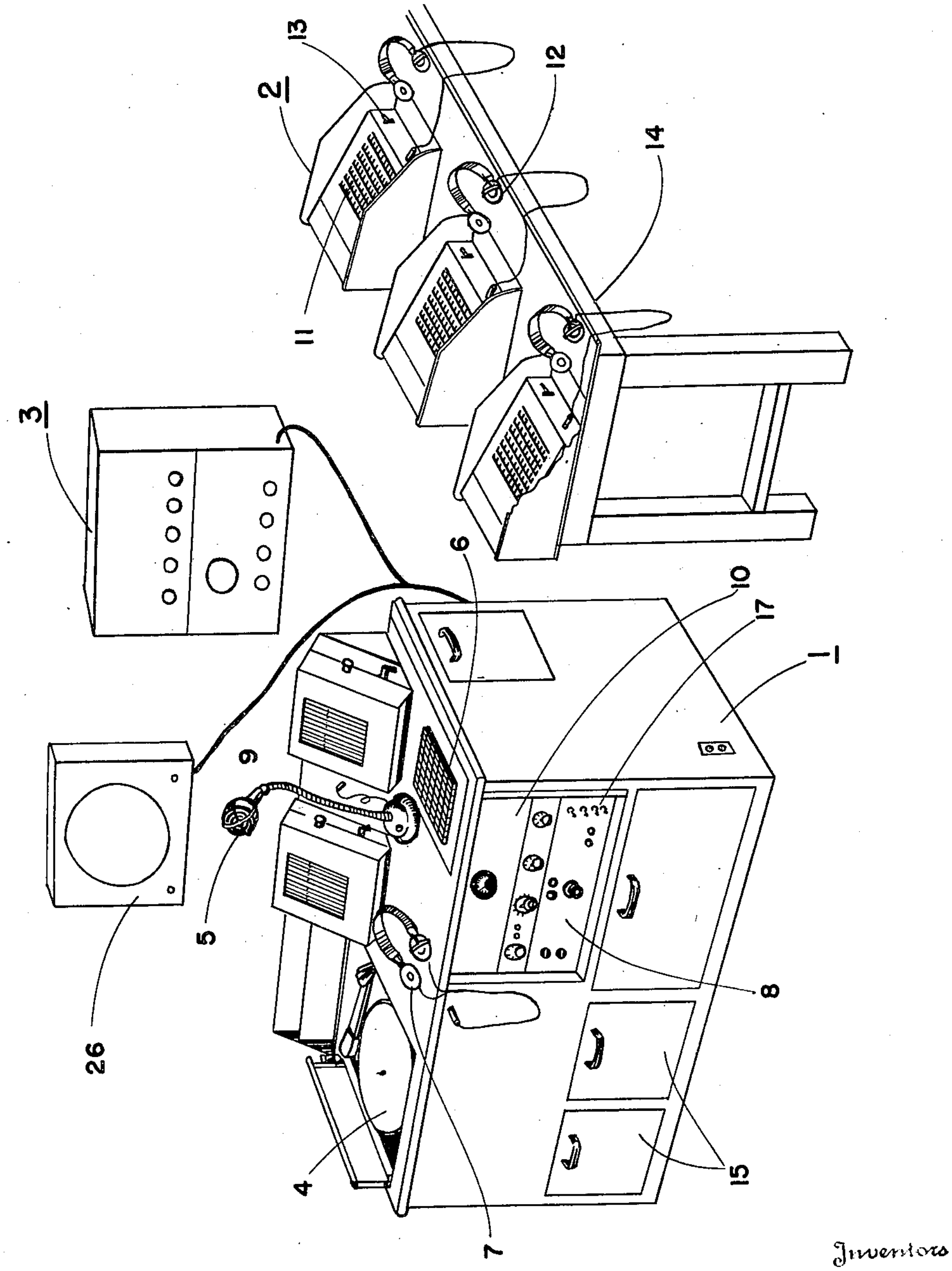
Fig. 1 is a pictorial view of an installation of the present invention.

In Fig. 1 are shown components of the present invention including an instructor's station 1, three students' stations 2, and standard shipboard listening receivers 3. The instructor's station equipment is arranged in a cabinet which includes: a phonograph 4; microphone 5; scoring keyboard 6; headphones 7; power supply control panel 8; two answer-recorders 9; and an amplifier control panel 10. Recordings of various underwater sounds are stowed in two drawers 15. A range indicator 26 is mounted near the instructor's station.

Each students' station is equipped with an answer keyboard 11, headphones 12, and a beat-counting key 13. Several student stations are mounted on a long table 14, and a maximum of 20 stations can be connected to the instructor's station 1.

Underwater sounds reproduced by the phonograph 4 are transmitted to the student's phones 12 through various amplifiers which are regulated by controls on the instructor's amplifier panel 10. The students are required to identify and interpret the sounds and indicate their results by pushing buttons on the answer keyboards 11, which buttons are titled and numbered appropriately for that purpose. The numbers of the buttons so pushed by the students are recorded on the score recorders 9. With this equipment 20 students can be instructed or examined simultaneously on underwater sounds. The instructor presses the correct answer on his keyboard 6. This action not only prints the answer on the recorders 9 but also adds conspicuous marks to the records of those students that press the corresponding key at the same time, to indicate that their answers are correct.

Figure 2:
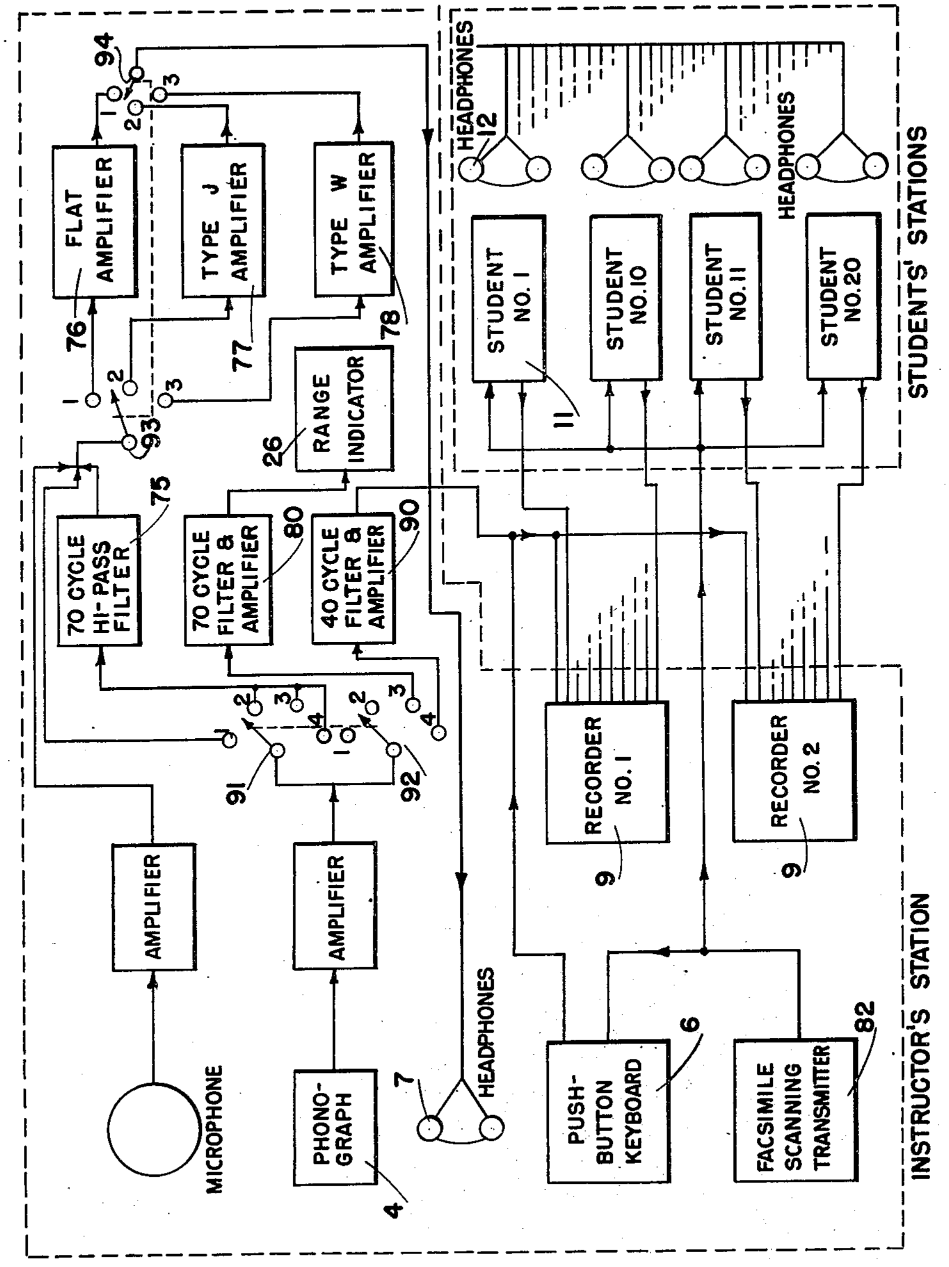
Fig. 2 is a simplified block diagram showing the general organization and relation of the units to each other.

Fig. 2 is a simplified block diagram indicating the organization and relation of the units of this apparatus. Tones of 40 C. P. S. and 70 C. P. S. are superimposed onto the phonograph recording for keying the range indicator 26 and for coding the score recorder 9.

Signals produced by the phonograph 4 are routed through selected channels by ganged circuit selector switches 91 and 92. When they are set in the first position or "normal" switch 91 routes the signal direct to amplifier selector switch 93. When switch 91 is set in the second position or "70 cycle hi-pass," it routes the signal to the switch 93 through a filter 75 which eliminates the 40 and 70 cycle keying tones. When the switches 91 and 92 are set in the third position or "keying," switch 91 routes part of the signal through the 70 cycle high pass filter 75 as before and switch 92 passes part of the signal to a 70 cycle keying filter and amplifier 80 which passes only the 70 cycle tone to the range indicator 26 for keying it. When the switches 91 and 92 are set in the fourth position or "coding," switch 91 again routes part of the signal through the filter 75 and the second switch 92 passes the signal to a 40 cycle coding filter and amplifier which passes only the 40 cycle notes to the score recorder 9. These 40 cycle signals on the phonograph recordings are used for coding the score recorders, which will be described presently.

The amplifier selector switches 93 and 94 are ganged and allow amplifiers 76, 77 and 78 to be connected separately into the circuit for amplifying the underwater sounds from the phonograph recordings. Flat, type J, and type W amplifiers 76, 77 and 78 are provided to simulate various shipboard listening conditions. Signals from the amplifiers are transmitted to the instructor's and students' headphones 7 and 12.

Push-button keyboards are provided at the instructor's station 6 and the 20 students' stations. These keyboards receive facsimile signals from a scanning transmitter 82 and transmit them to the two score recorders 9.

Figure 3:
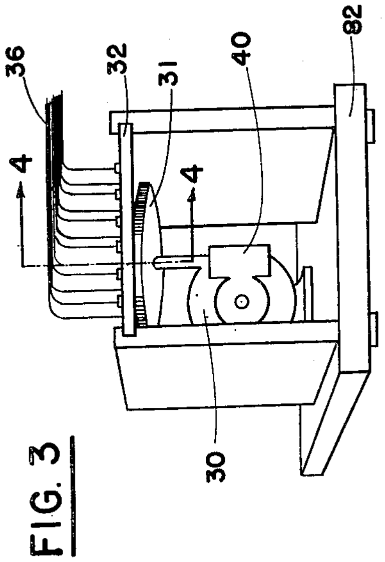
Fig. 3 is an elevational view of the facsimile transmitter.

Fig. 3 shows the scanning transmitter assembly 82. This device generates pulses of electrical current and transmits the pulses to the score recorders which will be described presently.

Figure 5:
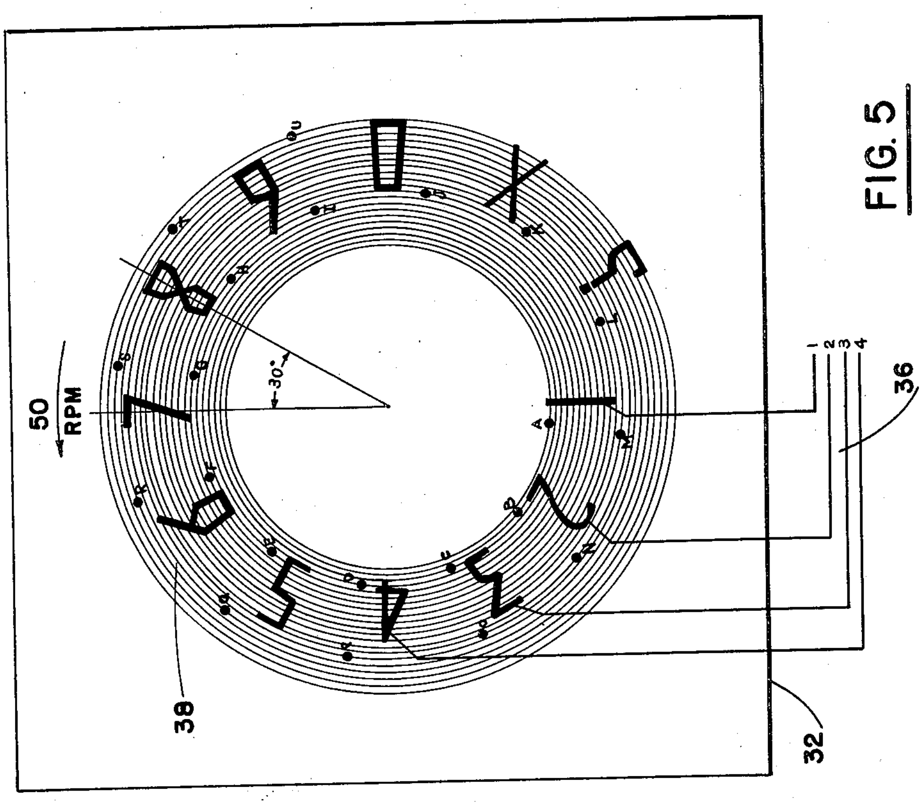
Fig. 5 is a partially diagrammatic view of the scanning apparatus thereof.
Figure 4:
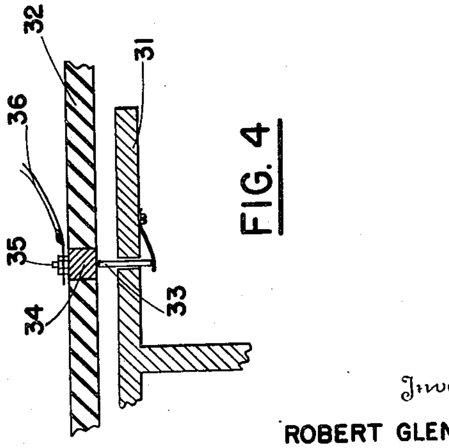
Fig. 4 is a detail thereof.

The scanning transmitter 82 is located on the power supply chassis 8 (Fig. 1) and is shown in detail in Figs. 3, 4 and 5. It includes a scanning disc 31, and a figure plate 32. A synchronous motor 30 rotates the scanning disc 31 by means of reduction gears 40 at 50 R. P. M. around a vertical axis. Twenty-one spring-loaded metal scanning pins 33 extend through the upper surface of the scanning disc and are arranged in a spiral so as to scan the lower surface of the figure plate 32. The plate 32 is made of an insulating material and the figures 34 are of inlaid brass. A terminal post 35 is attached to each figure to provide for the attachment of connecting wires 36.

Fig. 5 shows the arrangement of the metal figures on the lower or contact face of the figure plate 32. It also shows the positions at which the scanning pins A, B, C, etc. (carried by the scanning disc 31 of Fig. 3) touch the figure plate at the beginning of a scanning cycle. Each of these pins lies at a different distance from the center so that each traces a separate circular path 38 on the figure plate 32. Furthermore, the pins are spaced 30 degrees apart, that is 12 to a full circle. In scanning, all the pins are rotated about the center in a counterclockwise direction as viewed in Fig. 5.

For example, as these pins are rotated, pin B rides across the bottom edge of the figure 2. As pin B moves on to figure 1, pin C rides across the figure 2 along a line just above the one traced by pin B. Subsequently, pin D traces another line etc. until the eleventh pin rides L across the top edge of figure 2. The twelfth pin M misses the figure 2 entirely. Thereafter the cycle is repeated. As will be explained presently, the recorder operates in step with the transmitter so as to record the electric pulses and so reproduce the figures. It is desirable that all the twelve figures on the plate 32 be scanned simultaneously so that any two figures can be recorded simultaneously as a two-digit number. To this end the figures themselves are placed at increasing distances from the center of the plate to match the positions of the scanning pins. Thus the bottom edges of the figures 1, 2, 3, etc. are scanned simultaneously by the pins A, B, C, etc. respectively. Because of this spiral arrangement of the letters a total of 21 scanning pins are required.

Figure 6:
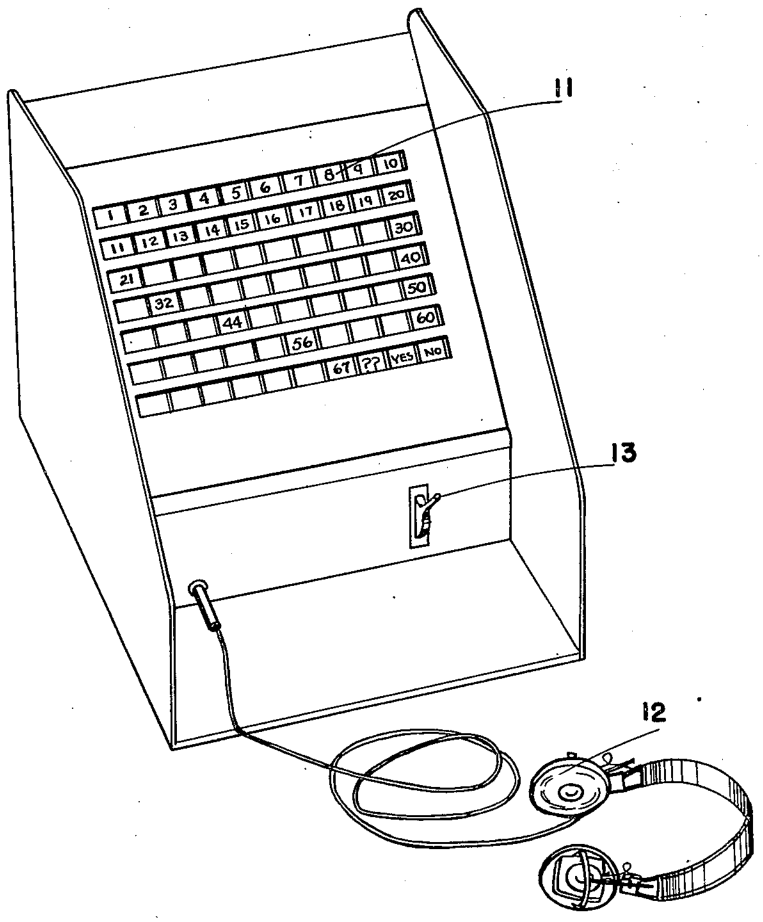
Fig. 6 is a front view of a students' push-botton keyboard.

Fig. 6 is a front view of one of the students' answer keyboards which has 70 numbered keys 11 arranged and numbered in horizontal rows of ten keys each. Each key also contains a name or mark relative to some underwater sound. Each push-button is connected to a double-pole spring-loaded switch that connects the circuits from the scanning transmitter to the recorder. Headphones 12 and a beat key 13 are provided at each students' station. The students receive the underwater sounds through the headphone circuits, and indicate their interpretations of the sounds by pressing the marked keys 11. The beat key 13 is connected to a spring-loaded switch and is used by the student to indicate the rhythm of propeller beats in the underwater sounds.

Figure 7:
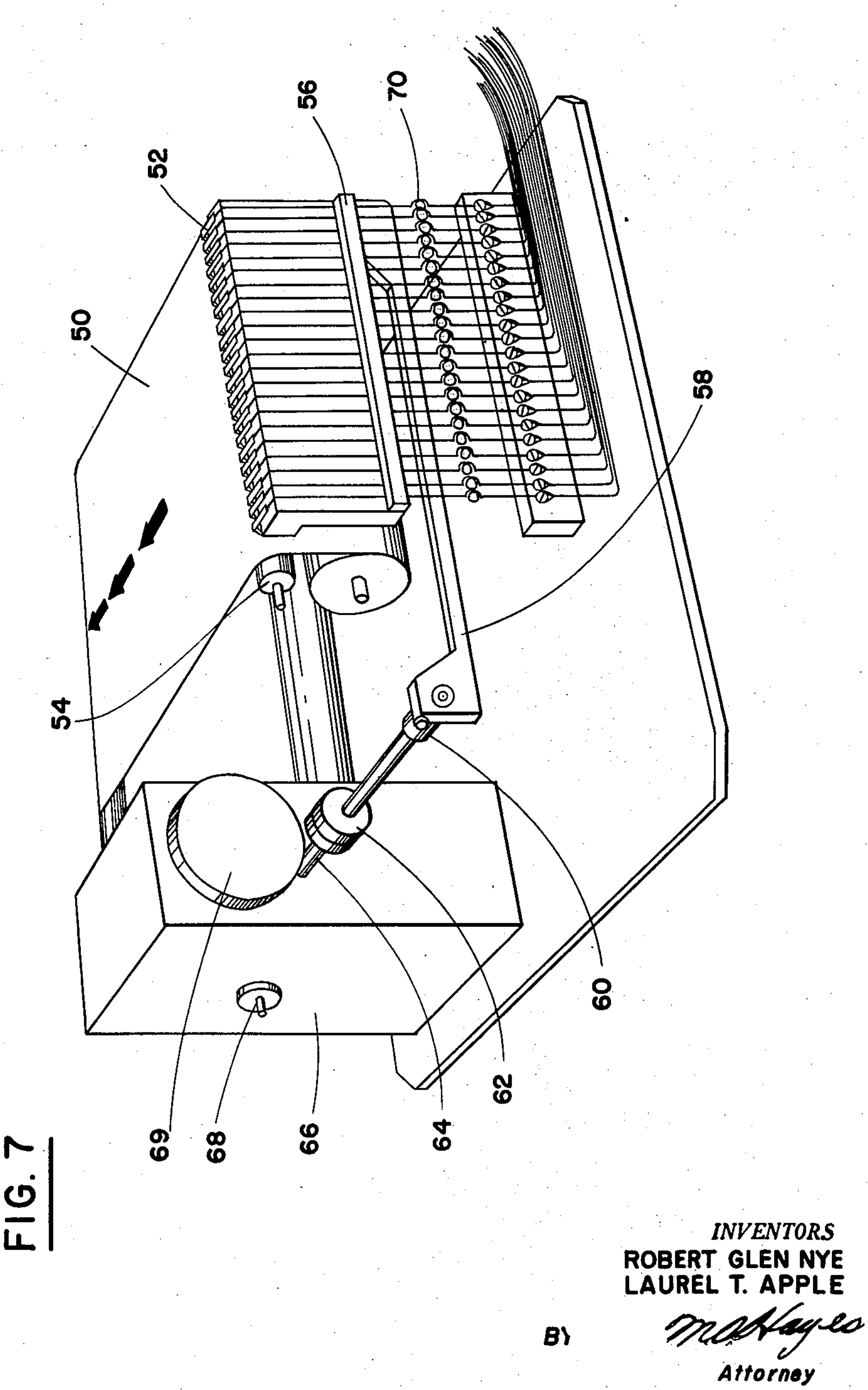
Fig. 7 is a pictorial drawing of the recorder assembly.

Fig. 7 shows the recorder 9. This device records eleven columns of two-digit figures on a strip of chemically treated paper 50. The characters recorded in the center double-column are those selected by the instructor on his keyboard 6. Each of the other ten double-columns records the answer of a separate student. The score recorders 9 (Fig. 1) are identical and may be operated independently or simultaneously under control of switches 17.

In Fig. 7, chemically-treated paper 50 is passed through the recorder 9 at a constant speed while eleven pairs of styli 52 mounted on a carriage 56 reciprocate laterally over the paper. The styli 52 are adjusted to press lightly on the paper 50 so as to maintain electrical contact with the paper. Under the paper and in line with the styli is a metal roller 54 that is grounded to the chassis of the recorder. When an electric voltage is applied to the styli, the electrical action darkens the chemically treated paper.

The styli carriage 56 is operated by a connecting rod 58 that is attached to a crank 60 that is connected by a shaft to a single-pin positive clutch 62. The clutch is driven by a sliding shaft 64 that is connected to a gear box 66. The gear box also drives a gear train that moves the paper through the recorder. A control shaft 68 is provided on the side of the gear box which operates the sliding shaft 64 to engage the styli carriage 56 and to change the speed of the paper 50. Two speeds are provided for the paper; the slower speed moves the paper at 7½" per minute when clutch 62 is engaged to drive the carriage 56, and the faster speed moves the paper at 30" per minute with clutch 62 disengaged. The slower speed is accordingly used for recording figures from the facsimile transmitter (keys 11 in Fig. 6) and the faster speed is used for registering propeller beat interpretations by means of key 13 in Fig. 6.

Electrical connections to the 22 score recorder styli are made through looped wires 70 which flex when the styli carriage 56 is reciprocating.

The recorder is drigen by a synchronous motor 39 (Fig. 8) which reciprocates the carriage 56 at 600 cycles per minute. A synchronizing hand-wheel 69 operates through a differential gear in the box 66 to advance or retard the carriage 56 with respect to the motor.

Referring to Fig. 5, since the scanning disc operates at 50 R. P. M. and each pin A, B, C, etc. scans 12 figures in succession during each revolution, the scanning rate is 600 figures per minute. It is this scanning rate that the reciprocating motion of carriage 56 must be synchronized with. Notice that the figures on the plate 32 have spaces between them which are substantially wider than the figures themselves. Since the pins move across the figures from right to left, the right-to-left motion of carriage 56 must occur when the scanning pins A, B, C, etc. are moving across the figures, and the left-to-right motion of the carriage 56 must occur when the scanning pins are moving across the blank spaces between the figures on the plate 32. Since the two synchronous motors driving the scanning disc and the recorder are relied upon to keep these two operations in step, and since the 60 cycle power frequency undergoes 3600 cycles per minute, it is apparent that when the equipment is first started up, there are six different phases of operation that the scanning disc 31 and carriage 56 can take, and that only one of these will correctly reproduce the figures on the recorder. Accordingly, when the equipment is first started up the instructor simply presses one of the keys on his keyboard 6 and then rotates the synchronizing handwheel 69 until the figures are reproduced properly.

Since the carriage 56 is driven by a crank it does not move the styli across the paper at uniform speed. The resulting distortion of the figures is minimized by using only the central portion of each sweep of the stylus, that is by making the characters on the figure plate narrower than the spaces between them.

Figure 8A:
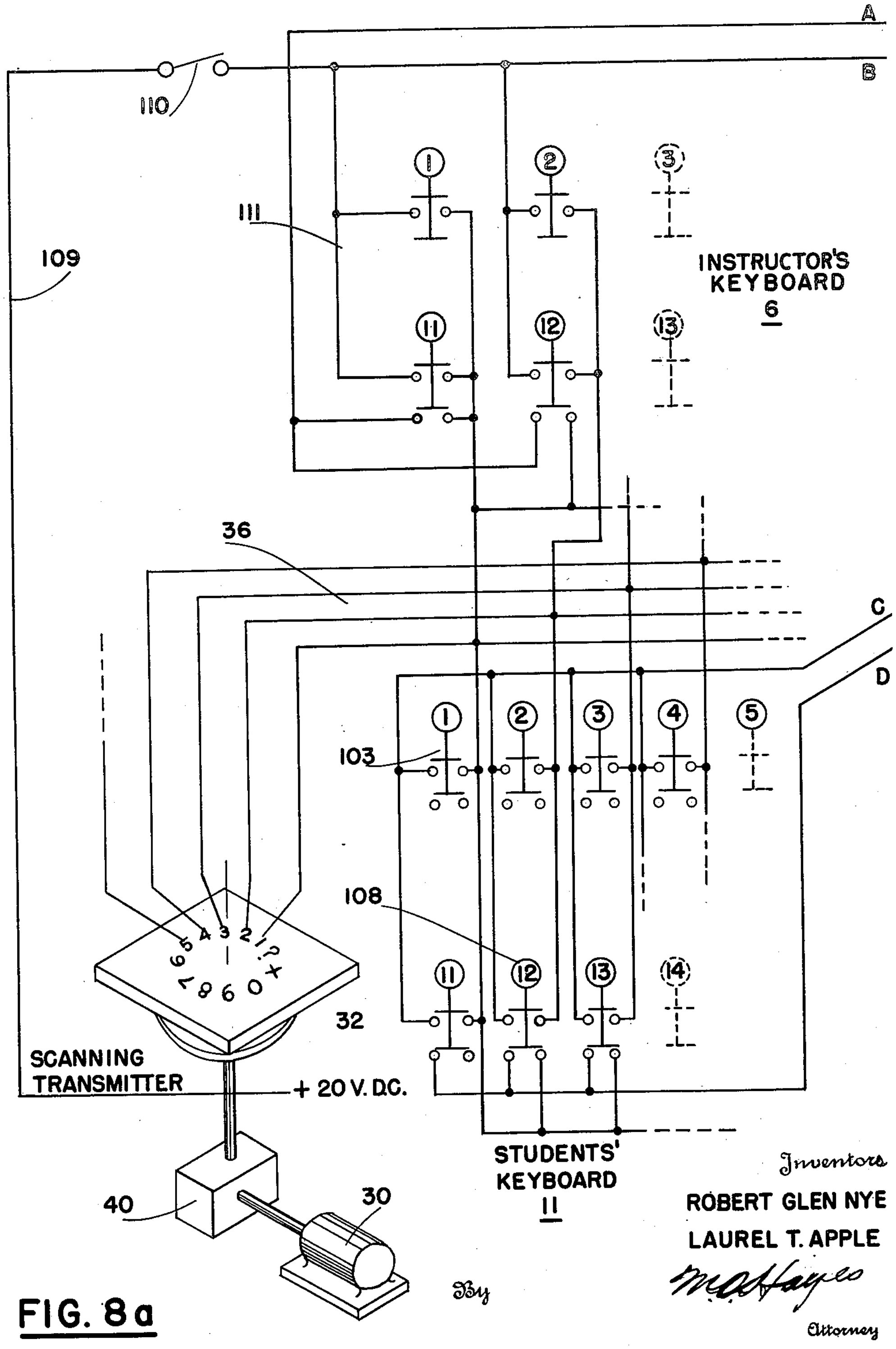
Fig. 8 is a schematic wiring diagram of the recording circuits.
Figure 8B:
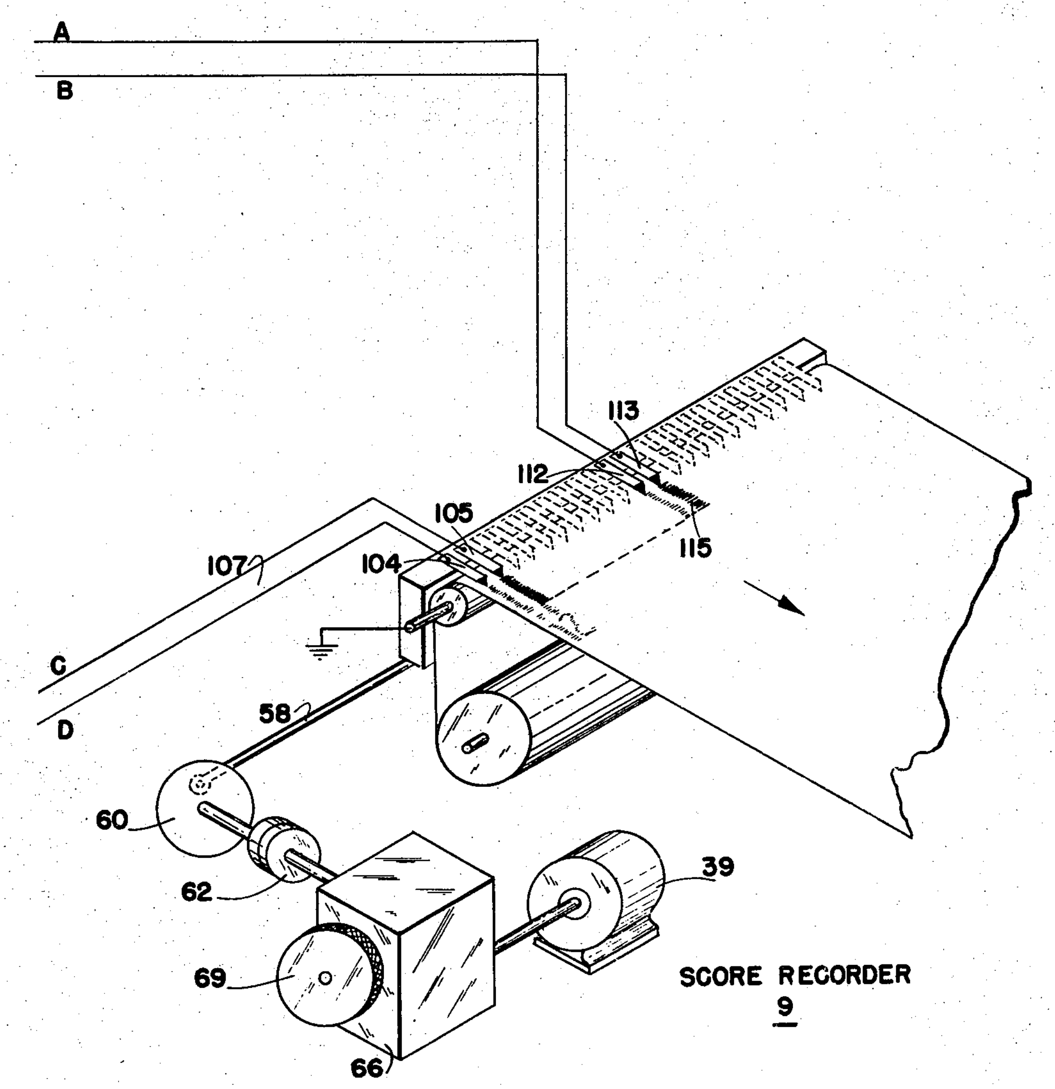

Fig. 8 is a schematic wiring diagram of the score recording system. Twenty volts D. C. is connected to the scanning disc 32 and when the disc is rotated the figures on the figure plate are contacted and electrical pulses are transmitted through 12 wires 36 to the instructor's and student's keyboards 6 and 11. Each keyboard contains 70 spring-loaded two-position double-pole switches 103 that are numbered consecutively. Each pole of each keyboard switch 103 is connected to a wire 36 from the scanning transmitter that is associated with the figures on the push-button of the keyboard switch. Single digit switches utilize only one pole of these switches, while two digit push buttons utilize both poles. Two styli 104 and 105 are provided on the score recorder 9 for each student. Therefore, only two wires 107 are required between each scoring keyboard and each pair of styli. For example, when the number 12 button 108 is pushed at the student's station 11, the No. 1 and No. 2 wires 36 are connected to the styli. Electrical pulsations which simulate the figure one are connected to the left stylus 104 and pulsations for figure two are connected to the right stylus 105.

The instructor's push-button keyboard is connected to his two styli 112 and 113 in the center column in a similar manner. The instructor also has a scoring switch 110. Its circuit consists of a 20 volt lead 109 which connects the switch 110 to the instructor's right stylus lead 111. When the score recorders are recording figures, that is to say when the styli carriage is in operation and the switch 110 is closed, power is fed into the instructor's right stylus 113 and because it is recording on both strokes, forms a column of lines 115 that are spaced only half the distance apart as the regular figures, thus forming a dark column the full width of the stylus stroke, which is wider than the figures. When one of the buttons on the instructor's keyboard is pressed and switch 110 is closed at the same time, the particular lead 36 that is connected to the pole of the push-button switch that is connected to the instructor's right stylus lead will be continuously energized. Any button on the students' keyboards that is pressed that is connected to the same lead 36 will print a solid column on the students' right stylus as on the instructor's right stylus.

The circuit afore described is utilized to assist the instructor to recognize students' errors in scoring. Since a solid column is made on the students' score when the same button is pushed as at the instructor's keyboard, the instructor can quickly observe if all the students' answers are correct by pressing the correct button. The right figure of any column that does not print dark can be quickly observed and the student corrected.

The 40 cycle and the 70 cycle signals that are filtered out of the signal from the recordings are also utilized to simplify the instructor's duties.

The 40 cycle signal, as previously described, is used to code the score recorder. It is filtered out, amplified, and applied to the instructor's left stylus 112 on the recorders 9 to provide a continuous mark that indicates the presence of a particular sound that the students are required to identify.

The 70 cycle signal, as previously described, operates the range indicator 26. The range indicator consists of a large dial carrying a scale marked in yards. A lamp arranged to move around this scale at constant speed is retained at the zero point of the dial until the 70 cycle signal releases it and allows it to rotate. This is of special value in lectures and demonstrations. The 70 cycle tone starts the lamp rotating at the occurrence of some significant sound, and the instructor identifies the time of occurrence of later sounds by the position of the lamp as, for example, "the splash at 1300 yards."

The present invention is capable of many modifications and variations and must be limited only to the scope of the claims.

We claim:

1. A signalling and scoring apparatus comprising in combination, a facsimile recorder having a plurality of separate recording means, a facsimile transmitter providing a plurality of separate output circuits, each with a distinctive facsimile signal, and a separate remote control station for controlling each of said recording means and for selectively transmitting said facsimile signals thereto.

2. The combination of the preceding claim wherein said recorder and said facsimile transmitter include scanning means operated in synchronism.

3. In combination, indicating means, a plurality of circuits, each constituting a source of a separate distinctive signal, remote control means for selectively energizing said indicating means from said circuits, and scoring means for selectively altering the signal of one of said circuits, whereby said indicating means shows an indication selected by said control means unless that selection coincides with the one of said scoring means, in which case said indicating means shows coincidence.

4. In combination, recording means, a plurality of signal transmitting circuits, each constituting a source of a separate distinctive signal, remote control means for selectively energizing said recording means from said signal transmitting circuits, scoring means for selectively altering the signal of one of said circuits, whereby said recording means records the signal selected by said control means unless that selection coincides with the one of said scoring means, in which case said recording means records said altered signal to show coincidence.

5. A facsimile transmitter for the simultaneous transmission of a plurality of character signals, comprising in combination, a rotatable member carrying a plurality of scanning contacts which are spaced at equal angular intervals about the center of rotation but at different distances from said center, a character member scanned by said contacts having characters spaced at the same angular intervals as said contacts and so disposed radially that the inner edges of all said characters are scanned at the same time.

6. A facsimile transmitter for the simultaneous transmission of a plurality of character signals, comprising in combination, a rotatable member carrying a plurality of spirally arranged scanning contacts which are spaced at equal angular intervals about the center of rotation, and at successively greater distances from said center, a character member scanned by said contacts having spirally arranged characters spaced at the same angular intervals as said contacts, and at radial intervals corresponding to those of said spirally arranged contacts whereby said characters are adapted to have corresponding portions thereof scanned simultaneously.

7. A facsimile recording system comprising in combination, a facsimile recorder including a plurality of reciprocable styli, means for moving a record strip under said styli in a direction perpendicular to the reciprocation, a transmitter for making said styli mark the record strip, said transmitter including a rotatable scanning member, a character plate having characters spaced at equal intervals about the axis of rotation of the scanning member and having spaces between said characters at least as wide as the characters themselves, said scanning member having scanning elements spaced at the same angular intervals as said characters, and means for driving said scanning member in synchronism with the reciprocation of said styli.

R. GLEN NYE.
LAUREL T. APPLE.

REFERENCES CITED

The following references are of record in the file of this patent:

UNITED STATES PATENTS

| Number | Name | Date |
|---|---|---|
| Re. 20,463 | Sveda | Aug. 3, 1937 |
| 2,150,256 | Warren | Mar. 14, 1939 |
| 2,296,274 | Finch | Sept. 22, 1942 |
| 2,401,462 | Clausen | June 4, 1946 |